United States Patent [19]

Hendricks

[11] Patent Number: 4,556,811
[45] Date of Patent: Dec. 3, 1985

[54] COIL UNIT AND COIL FORM FOR ELECTRICAL MACHINES

[75] Inventor: Howard F. Hendricks, Lansdale, Pa.

[73] Assignee: Electric Indicator Company, Inc., Norwalk, Conn.

[21] Appl. No.: 665,082

[22] Filed: Oct. 26, 1984

Related U.S. Application Data

[63] Continuation of Ser. No. 111,125, Jan. 10, 1980, abandoned.

[51] Int. Cl.⁴ .............................................. H02K 1/22
[52] U.S. Cl. .................................... 310/266; 310/208; 336/208; 336/225
[58] Field of Search ................ 310/266, 208, 42, 206, 310/207, 198, 268; 338/174; 219/376; 336/180, 225, 198, 208, 188, 189, 190, 191

[56] References Cited

U.S. PATENT DOCUMENTS

| | | | |
|---|---|---|---|
| 1,402,587 | 1/1922 | Evershed | 338/174 X |
| 1,572,047 | 2/1926 | Shephard | 336/189 |
| 1,637,649 | 8/1927 | Kupka | 336/189 |
| 3,209,187 | 9/1965 | Angele | 310/266 |
| 3,356,877 | 12/1967 | Burr | 310/266 |
| 3,360,668 | 12/1967 | Faulhaber | 310/266 X |
| 3,431,638 | 3/1969 | Burr | 310/268 |
| 3,467,847 | 9/1969 | Faulhaber | 310/266 |
| 3,698,079 | 10/1972 | Lifschitz | 310/266 X |
| 3,904,851 | 9/1975 | Gustafson et al. | 219/376 X |
| 4,019,075 | 4/1977 | Kagami | 310/266 X |
| 4,103,196 | 7/1978 | Saito et al. | 310/266 |
| 4,123,679 | 10/1978 | Miyasaka | 310/266 |
| 4,271,370 | 6/1981 | DiMeo | 310/266 |

FOREIGN PATENT DOCUMENTS

| | | | |
|---|---|---|---|
| 2003729 | 8/1970 | Fed. Rep. of Germany | 310/266 |
| 139375 | 12/1979 | Fed. Rep. of Germany | 310/266 |
| 1306937 | 2/1973 | United Kingdom | 310/266 |

*Primary Examiner*—Thomas J. Kozma
*Attorney, Agent, or Firm*—Daniel H. Steidl

[57] ABSTRACT

A coil unit for use in brushless and ironless armature motors which includes the form upon which the same is wound and providing, in its complete form, a self supporting coil unit which may be inserted into the laminations or soft iron shell of a motor.

The complete coil unit includes a plurality of individual coils which are arranged in skewed, longitudinal, side-by-side relation to one another and the individual windings of the coils are positioned on both the inner and outer surfaces of the coil form, the inner and outer windings pairs being diametrically opposed to one another to thereby provide a pair of diametrically opposed coil portions which are connected in series aiding fashion.

The coil form is a thin, longitudinally extending, tubular member of a non-magnetic material providing coil winding and locating cutouts or serrations on the longitudinal ends thereof. The cutouts provide a winding surface for the turns of the coils, the surface being angularly offset to a plane arranged radially to the axis of the coil form, and a positioning surface being angularly offset to an axially extending plane such that the last turn of one winding may lie in side-by-side relation to that of the next winding.

13 Claims, 7 Drawing Figures

__NUM__4,556,811__NUM__

COIL UNIT AND COIL FORM FOR ELECTRICAL MACHINES

This application is a continuation of application Ser. No. 111,125, filed Jan. 10, 1980, now abandoned.

FIELD OF THE INVENTION

This invention relates generally to the excitation of coils of electric motors and specifically to the windings of and winding support elements for the excitable coils which are used in brushless and ironless armature motors or other electrical machines.

BACKGROUND OF THE INVENTION

Brushless and ironless armature motors are well known in the prior art.

In brushless motors, where the windings are provided as part of the stator, it is common to provide winding locating slots in the iron of the motor shell and to locate the windings therein. Normally, the coils are wound and then placed into and secured within the formed slots. The forms upon which the coils are wound provide the shaping of and for the coils and do not become an integral portion of the completed motor.

In his consideration of the prior art, the pertinent patent art in the winding of such coils appears to be best illustrated by the U.S. to Miyasaka, U.S. Pat. No. 4,123,679 and Kagami, U.S. Pat. No. 4,019,075. Neither of these patents, however, provides a coil form which remains as an integral portion of the wound coil and neither of which provides a single coil element which, in effect, due to the electrical angle of the windings, provides a pair of coil portions which are connected to each other in series aiding relationship.

In the coil provided in the Miyasaka reference, it is necessary to physically locate the desired and to, somehow, position the wire forming the coil at such point and to thereafter sequentially form the following windings therearound. The Miyasaka reference also provides a wound coil which will be electrically inconsistent at these apical regions of winding unless there is no concern for a loss of wound length of the coil and the apical portions thereof are then disregarded. The coil unit resulting from the applicant's invention provides for consistent electrical properties along the entire wound cylinder and this utilization results in both an electrically efficient and an economical coil unit by making use of all the winding material provided.

The coil winding resulting from the application of the principals of the Kagami reference is not of the skewed variety and is rather concerned with hexagonal winding to therefore result in a hexagonal coil. The wound hexagonal portions are formed about a cylindrical coil former in a fashion to eliminate any coil overwrap exceeding two coil thicknesses. This reference does provide a comparison of bobbinless and spool winding of coils and it appears that the applicant's method and resulting coil unit could, at most, be compared to a spool method wherein the spool forms a portion of the resulting winding.

In summary, the prior art does not appear to provide any teachings which would directly include the applicant's concept nor enable one skilled in the art to arrive at applicant's concept.

SUMMARY OF THE INVENTION

The coil unit and coil form as provided herein includes a longitudinally extending, tubular member formed of a relatively thin, non-magnetic material having inwardly directed, sawteeth-like wire and winding locating cutouts or serrations on the respective ends of the same. The wires forming the individual coils are located in the formed cutouts or serrations and each coil, in its finished form, is self supporting.

The inner diameter of the coil form is determined by adding the desired gap to the diameter of the magnets carried by the rotor of the motor and adding the diameter or thickness of the wire to be would thereto. The finished, self-supporting coil unit is designed to be inserted into the stator laminations or soft iron shell of the stator and laminated or potted in place. The self supporting coil unit as described herein will simplify the normal process of winding the stator.

The finished, self-supporting coil unit is of a relatively thin radial dimension, depending upon the diameter or thickness of the wire wound upon the coil form.

The windings for the coils are skewed about the coil form and the serrations provide a first, wire locating surface arranged at an angle with respect to a radial plane passing through the coil form having a length to position the desired number of winding turns of the individual coil in side-by-side relation thereon. The next succeeding winding will begin at the longitudinally innermost portion of a cutout and in order to provide that adjacent coils are in close, side-by-side relation the longitudinally arranged surface of the cutout portions is arranged angularly with respect to a longitudinally extending plane through the axis of the coil form. This will provide the last turn of an individual coil to lie adjacent the innermost angle of the cutout portion and thus allow the turn received in such innermost portion to lie adjacent thereto.

In winding the individual coils about the coil form, a single coil winding will pass twice about the outer periphery of the coil form and twice on the inner surface thereof. Such a winding will provide a pair of individual coil portions positioned in diametric opposition to one another with the same being connected in series aiding fashion.

The coils provided and the coil form allowing for the winding of such complete coils then provides a relatively thin unit having a high density of copper or conductor and which provides a substantially strong mechanical assembly. A motor using such coils will have a high Unit Torque versus Unit Volume efficiency and the use of the coils will eliminate slot cogging which is of particular importance for servo applications.

It is therefore an object of the applicant's invention to provide a coil form for the winding of a relatively thin excitation field coil unit for a brushless or ironless armature motor.

It is a further object of the applicant's invention to provide a coil form for the winding of an excitable winding thereon having wire locating and positioning surfaces on the longitudinal ends thereof such that the individual turns of a single coil may be positively positioned in a side-by-side relation.

It is a further object of the applicant's invention to provide a relatively thin multi-coil winding for use in brushless or ironless armature motors wherein the is no overlapping of the individual turns of the complete coil unit.

It is still a further object of the applicant's invention to provide a multi-coil winding for use in the stator of a brushless or ironless armature motor wherein the coils are arranged in skewed fashion upon a coil form.

It is still a further object of the applicant's invention to provide a multi-coil winding for a brushless or ironless armature motor wherein the individual coils include a pair of coil portions arranged in diametrically opposed relation to one another and may be connected in series aiding relation.

These and further objects of the applicant's invention will more fully appear from a consideration of the description of a preferred form of the invention following hereafter.

DESCRIPTION OF THE DRAWINGS

The following is a brief description of the accompanying drawings in which the same numeral or indicia is used to identify the same or similar parts throughout the several views, and in which.

DESCRIPTION OF A PREFERRED EMBODIMENT

Figure 1:
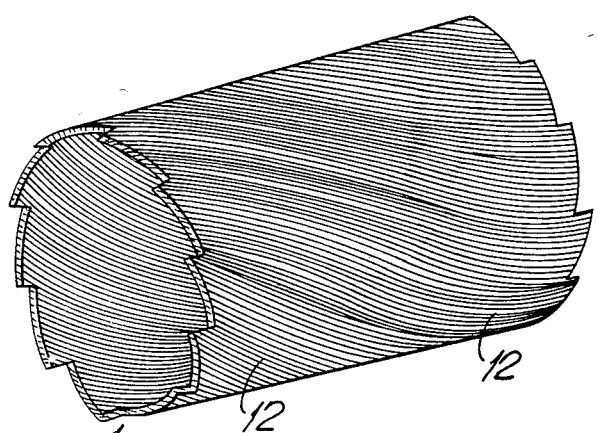
FIG. 1 is a perspective view of a complete, multi-coil coil unit for use in a brushless or ironless armature motor embodying the concepts of the applicant's invention.
Figure 2:
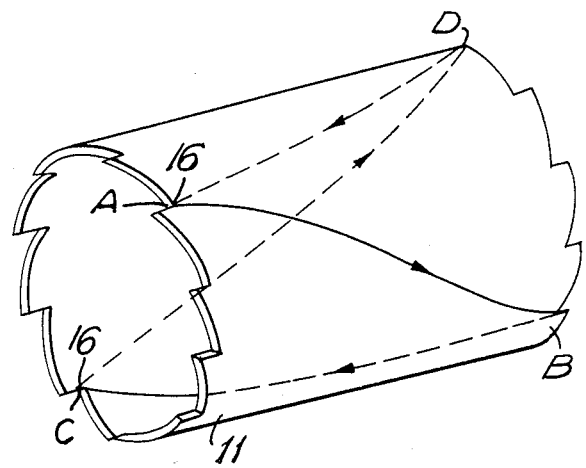
FIG. 2 is a perspective view of the coil form upon which a multi-coil coil unit is wound and tracing an individual winding of a coil thereon.
Figure 3:
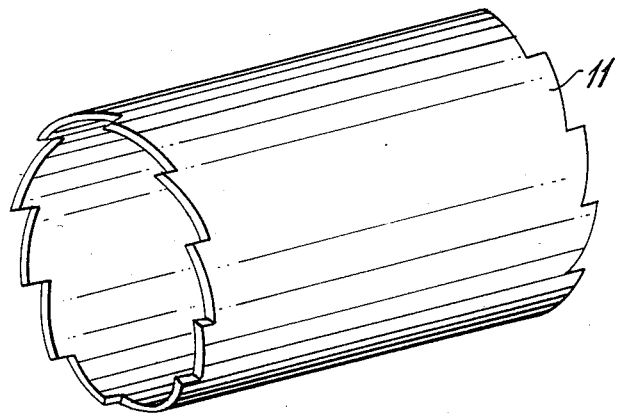
FIG. 3 is a perspective view of the coil form for the winding of a multi-coil winding.
Figure 4:
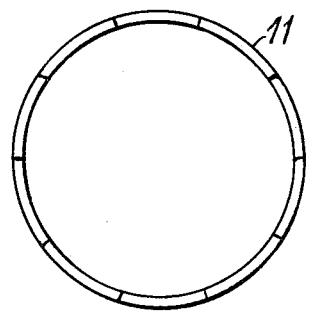
FIG. 4 is an end view taken from one end of the coil form.

In accordance with the accompanying drawings, the complete multi-coil and coil form which may be utilized in an ironless armature or brushless motor is illustrated in FIG. 1 and is designated in its entirety 10. The unit 10 includes the coil form 11 and the coils 12 that are wound thereon. A single winding of a coil 12 is illustrated in FIG. 2 to illustrate the method in which the complete, multi-coil unit is wound and the advantages of the coil form 11 of the invention.

The coil form 11 consists of a longitudinally extending, tubular member, formed of a non-magnetic material and having sawteeth-like cutouts or serrations, generally designated 13, on each end thereof.

Figure 6:
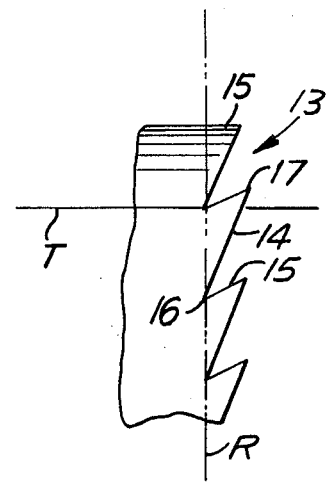
FIG. 6 is an illustration of a portion of a longitudinal end portion of the coil form and being drawn to an enlarged scale; and, FIG. 7 is a view similar to FIG. 6 and illustrating the placement of adjacent individual coils in side-by-side relation as the same will result from the use of this form.

The serrations 13 provide a pair of surfaces for the positioning of the turns of and thus the coil windings therein. A first of these surfaces is designated 14 and, as illustrated in FIG. 6, is arranged at an angle with respect to a radial plane R which is arranged normal to the axis of the coil form 11. The second of these surfaces is designated 15 and is arranged at an angle with respect to a longitudinally extending plane passing through the axis of the coil form 11, the plane being designated T. The junction of these two surfaces 14, 15 then provides a notched area with the longitudinally innermost portion designated 16 and the outermost portion designated 17.

The coils and coil form as illustrated herein provide for five (5) coils and therefore effectively provides ten (10) individual coil portions which are connected in series aiding fashion. The angle of surface 14 with respect to plane R in this particular configuration is preferrably fifteen degrees, but this angle may be selected from within the range of ten degrees to thirty degrees. The angle of surface 15 with respect to plane T is, for this configuration, twenty-six degrees.

Figure 7:
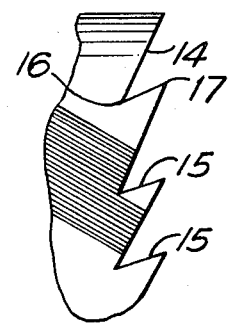

Certain criteria exists for surface 14 and one such requirement is that the length thereof must accomodate the number of individual turns that are placed thereon, each being in side-by-side relation. It is also necessary that adjacent coils are in side-by-side relation as particularly illustrated in FIG. 7. As illustrated therein, the final turn of one coil is adjacent to the first turn of the next adjacent coil and therefore the applicant has provided the angular relationship of surface 15 to plane T.

In the form shown, the multi-coil unit embodies five (5) coils. A single winding for one of such coils is illustrated in FIG. 2. With a starting point of point A, the wire extends to point B about the outer periphery of the form 11, point B being displaced 90° from point A and thereafter along the inner surface of the form 11 to point C, point C again being displaced 90° from point B, thence along the outer periphery of the form 11 to point D and then along the inner surface to point A. Points A, B, C and D are spaced 90° from each other and thus points A and C and points B and D are spaced 180° from each other. With the five coils illustrated, it should be apparent that there are ten (10) such serrations on each end of the form 11.

Figure 5:
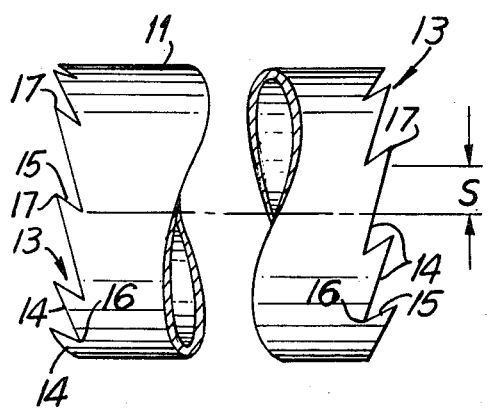
FIG. 5 is a side elevation of the coil form.

Modifications in the skewed effect for the coils may be obtained in accordance with the illustration of FIG. 5. As shown therein, winding surfaces 14 on the respective ends of the form 11 may be in longitudinal alignment with each other or they may be shifted as illustrated by the indicia S. In the form shown, S represents a longitudinal, angular offset of 18°. With this angular offset, the physical measurement of the offset is one half of the angular tooth width for a ten (10) tooth version. In this case the teeth are 36° wide, but it should be obvious that variations in the number of coils will modify this particular relationship.

With the winding of the individual coils as illustrated, it should be obvious that the coil portions arranged on the inner and outer surfaces of the coil form are diametrically opposed to one another and thus each complete winding provides a pair of excitable coil portions which will be an improvement in brushless or ironless armature motors.

With the coil form as illustated and discussed herein, a self supporting unit is provided. This unit may be inserted, in wound form, into the inner diameter of a soft iron stator or may be inserted into the inner diameter of the motors laminations as is particularly illustrated and discussed in my co-pending application entitled Brushless D.C. Motor and Control Circuit Therefore, now abandoned.

In the case of ironless armature motor applications, the self supporting coil structure will rotate freely about the inner and outer magnetic path providing structure and this coil form and resulting coil will improve the torque, ripple characteristics of such a motor.

It should be obvious that the applicant has provided a unique coil form and with the windings thereof a unique coil unit for use in an ironless armature or brushless d.c. motor.

What I claim is:

1. A coil form and coils for use in electrical machines, comprising:
   (a) a longitudinally extending tubular member;
   (b) a plurality of winding locating serrations arranged about the circumference of each of the first and second longitudinal ends of said member;
   (c) each of said serrations including a first and a second surface, said first surface being arranged angularly at an acute angle in a range of from 10° to 30° with respect to a plane extending through and normal to the axis of said tubular member, said second surface being arranged angularly at an acute angle with respect to said first surface, and said angularly arranged first surface having sufficient length to support a plurality of winding turns in side by side relation;
   (d) a plurality of coils wound upon said tubular member, each coil including a winding extending from the first surface of a starting serration at one end of the tubular member and making at least two passes about the outer and inner surfaces of the tubular member before returning to the first surface of the starting serration, each pass extending diagonally from the first surface of a serration at one end of the tubular member over one of the outer or inner surfaces of the tubular member to the first surface of an angularly displaced serration at the other end of the tubular member and then diagonally over the other of the outer or inner surfaces of the tubular member to the first surface of an angularly displaced serration at the one end of the tubular member, and said first surface of each serration supporting a plurality of winding turns in side by side relation.

2. The invention defined in claim 1 wherein the number of winding locating serrations at each end of the tubular member is at least twice the number of coils wound upon the tubular member.

3. The invention defined in claim 2 wherein there is an odd number of coils wound upon said tubular member.

4. The invention defined in claim 2 wherein portions of each coil lie diametrically opposite each other on the tubular member.

5. The invention defined in claim 2 wherein the said second serration surfaces are arranged angularly with respect to a plane extending longitudinally with the axis of said tubular member.

6. The invention defined in claims 2 or 5 wherein multiple windings of each coil occupy most of the first serration surface of each serration contacted by said windings, the windings at the sides of each coil lie directly adjacent the windings of adjoining coils, and the entire inner and outer surfaces of the tubular member, inwardly of its serrations, are occupied by windings in side-by-side relation.

7. The invention defined in claim 2 wherein the serrations at the first end of the tubular member are longitudinally aligned with the serrations at the second end of the tubular member.

8. The invention defined in claim 3 wherein the serrations at the first end of the tubular member are angularly offset from the serrations at the second end of the tubular member.

9. The invention defined in claim 2 wherein the serrations sequentially contacted by each winding are displaced 90° from each other whereby each winding returns to its starting serration after two passes.

10. The invention defined in claim 2 wherein each serration first surface is angularly offset from said plane in a range of from 10° to 30°.

11. The invention defined in claim 10 wherein the angle of offset is 15°.

12. The invention defined in claim 5 wherein each serration second surface is angularly offset from said longitudinal plane at an angle of 26°.

13. The invention defined in claim 4 wherein the said portions of each coil are connected in series-aiding relation.

* * * * *